3,500,395
FOREST TERRAIN SEARCH RADAR METHOD
AND APPARATUS
George Michael Foster, 1422 Mount Hope Ave., Rochester, N.Y. 14620, and Louis Vincent Surgent, Jr., 323 Adair Court, Joppa Towne, Md. 21085
Continuation-in-part of application Ser. No. 549,626, May 12, 1966. This application Dec. 6, 1967, Ser. No. 688,537
Int. Cl. G01s 9/00
U.S. Cl. 343—5
11 Claims

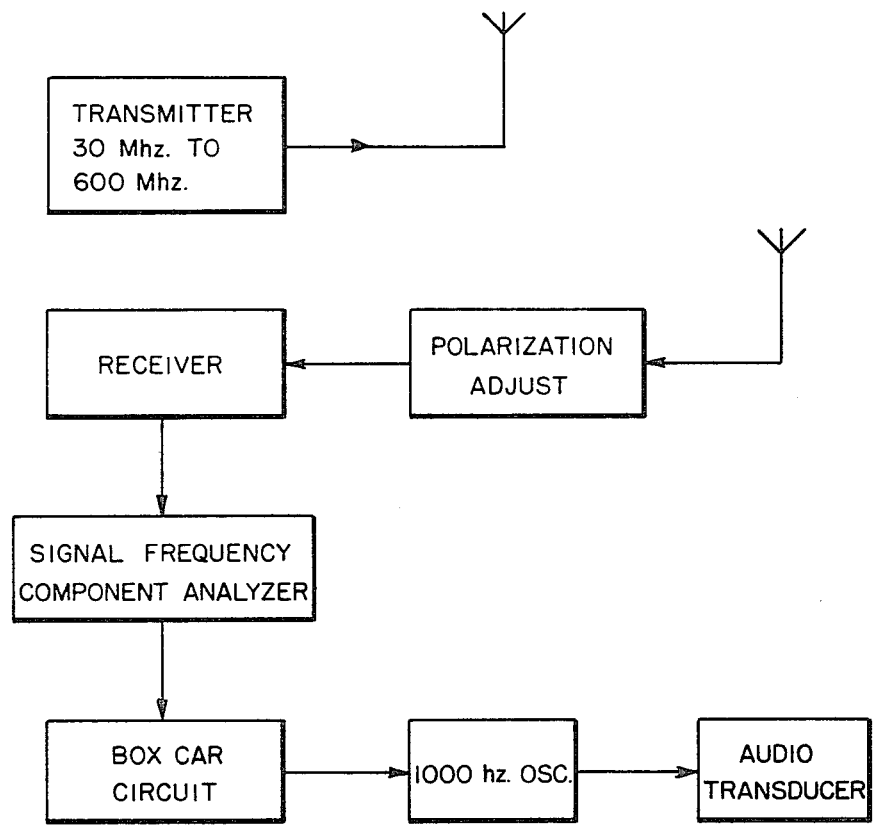

ABSTRACT OF THE DISCLOSURE

A forest terrain search radar is effective in the radio frequency range of about 30 mHz. to about 600 mHz. for detecting moving targets, and other targets having known reflecting characteristics. Forests are found to be translucent to radio transmission in the stated frequency range, which also includes the Mie frequency spectra of many objects of practical search interest, thus enabling target echo discrimination based on the phenomenon of target resonance responsively to the transmitted signal.

BRIEF SUMMARY OF THE INVENTION

This application is a continuation-in-part of our co-pending application, Ser. No. 549,626, filed May 12, 1966, now abandoned.

This invention relates to novel radar methods and apparatus, and more particularly, to novel methods of and apparatus for detecting moving targets and objects of known characteristics in forest terrain or in other similar environments that tend to produce heavy radar clutter.

Despite intensive and sophisticated development of radar since shortly before World War II, radar has not heretofore been successfully adapted to searching for targets such as troops in ambush or on the march in forested terrain. Clutter signals returned by the forest have, in all cases, so heavily obscured the targets it was desired to detect that radar has long been regarded as impractical for searching in forests.

The methods and apparatus of the invention have been found to be highly effective for this purpose and readily detect predetermined targets in forest terrain.

Briefly, the first, and presently most important aspect of the invention relates to the unexpected and surprising discovery that radiation at frequencies of about 30 megahertz to about 600 megahertz is able to penetrate forests and to return recognizable radar signals from electrically conductive objects in the forests. Forests appear to be translucent to radiation in this wavelength range. The trees seem to scatter the incident radiation sufficiently to obviate the ground reflection, which hinders detection of targets on bare terrain, but not enough to obscure targets completely. The effect appears to be most pronounced in the frequency range of between about 100 mHz. and 200 mHz. At these frequencies, it now appears that only the trunks of the trees, and the major branches contribute to the clutter signal, while the twigs and leaves return little or no echoes, and do not render the forest opaque, as they do at microwave frequencies. The relative transparency of the twigs and leaves also tends to minimize the effect of wind on the clutter signal, so that the clutter fluctuates only slowly in response to winds of up to about thirty miles per hour or so.

According to another feature of the invention, the radar is tuned to a frequency at which the predetermined target tends to resonate so that its radar cross section is maximized, or at least larger than its normal cross section at microwave frequencies. Although an analogous system was heretofore proposed for sonar (see Patent No. 1,504,-247 issued to W. W. Jacques, Aug. 12, 1924) its use in radar has not been previously suggested, possibly because the resonance effect for electromagnetic radiation has not been regarded as of sufficient magnitude to produce a significant improvement in radar results. Also, in radar work, the emphasis ever since the early developmental years has been largely centered on the use of microwave radiation, that is, of radiation having a wavelength of about thirty centimeters and shorter. Radiation in this wavelength range is much shorter than the wavelengths of the resonant spectra of most targets of military and general search importance.

The initial work in reducing the invention to practice, which led to the discovery of the translucence of forests to radiation at the stated frequencies, was based on the concept of producing a resonant response in a target such as a rifle or machine gun, thereby to increase its radar cross section and make it discernible over the forest clutter. Calculations indicated that a frequency of about 150 mHz. would be required to produce a resonant response for a typical submachine gun or rifle, and the equipment was set up to operate at about that frequency. Good results were achieved due not only to the enlargement of the radar cross section of the rifle, but also to the surprising and unexpected response of the forest to radiation of the relatively low frequency used.

Not only was it found that forests are translucent to radiation in the stated range of frequencies, but it was also found that forests affect the radiation in a way such that the polarization of the clutter echo signals returned from them are angularly displaced from the polarization of the incident radiation by usually less than 90°, but with a high degree of uniformity. This phenomenon makes possible the use of polarization techniques to minimize the clutter without unduly attenuating the desired signal. Typical methods for taking advantage of this effect are described in U.S. Patent No. 2,508,571 to Hudspeth, and No. 3,234,547 to Katzin.

It has also been found that any moving object of reasonable size such as, for example, a man walking in the forest, returns an echo signal that fluctuates so as to be readily recognizable and distinguishable over the clutter under most conditions. The target resonance phenomenon need be resorted to only in cases where it is desired to detect stationary targets, although it is of advantage in all cases.

In general, therefore, the invention in its primary aspect contemplates simply the use of radiation at frequencies in the range of 30 mHz. to 600 mHz., preferably of 100 mHz. to 200 mHz. for radar searching in forest terrain, and preferably coupled with the use of means for emphasizing the desired target signal relative to the clutter signal to improve the target signal-to-clutter ratio. For detecting small targets such as personnel and vehicles, it is important that the pulse width of the transmitted pulses be as short as possible, because the pulse width is the major determinant of the range resolution and affects the target signal-to-clutter ratio. The target signal may be further emphasized by any desired means, several of which are known in the art. Polarization techniques may be used, subtraction of an echo signal received from one transmitted pulse from the signal received from succeeding ones, and various different methods of echo signal analysis such as, for example, the Mie region spectral analysis method described and claimed in our copending application, Ser. No. 688,538, filed concurrently herewith, and entitled, "Radar Method Using Mie Region Analysis."

In another aspect, the invention contemplates the operation of a radar at frequencies at which predetermined targets exhibit a resonance effect and return echos that are stronger than those produced in response to illumination at other frequencies.

DETAILED DESCRIPTION

Representative embodiments of the invention will now be described in detail in connection with the accompanying drawing, wherein the single figure is a schematic diagram in block form of a radar system according to our presently preferred embodiment of the invention.

In accordance with the invention, it has now been found that forests are translucent to radar signals in the stated frequency range. They diffract and diffuse the incident signals enough to reduce the ground reflection so that targets in the forest return echo signals, and, because the component vegetative elements of the forest are small relative to the wavelengths of the radiation, the radiation is able to penetrate the forest without excessive attenuation. And, because the small twigs and leaves return practically no echo signals, the clutter echo signals are highly stable, fluctuating only slowly, in accordance with the slow motion of the tree trunks, when the forest is disturbed by wind.

Forests also tend to change the polarization of the radiation so that the radar return remains fairly well polarized, but rotated usually through an angle of less than 90° from the polarization of the transmitted signal. The effect is not fully understood, but it appears to be connected with the dielectric characteristics of trees and the fact that the vast majority of trees are arranged with their principal elements, the trunks, vertical and their major branches generally horizontal. The nature of the vegetation in the forest, the relationship between the sizes of the tree trunks and of the major branches, and the angular disposition of the major branches appear to affect the degree of rotation. The rotation, therefore, differs from forest to forest and no uniform figure can be given.

In the presently best known method of carrying out the invention, advantage is taken of the rotation of the polarization of the clutter signal relative to the transmitted signal to reduce clutter. In the simplest form, two separate antennas are used, one for transmitting and the other for receiving. Best results have so far been achieved starting with the transmitting antenna oriented for horizontal polarization, or arranged for elliptical polarization with the major elliptical axis in the horizontal direction. The polarization of the receiving antenna is then rotated to a point at which the average clutter is at a minimum over the desired range. In most cases, this simple adjustment serves to reduce clutter by more than 20 db, to a point where target signals are readily discernible over it. In some cases also, the average clutter may be further reduced by thereafter changing the polarization of the transmitted signal. If a change in the polarization of the transmitted signal results in a detectable further clutter reduction, it is then desirable once again to adjust the receiving antenna. Also, once the receiving antenna is initially adjusted for minimum average clutter, the two antennas may be adjusted synchronously for further reduction, with the final adjustment being obtained by adjusting the receiving antenna alone. A single antenna may also be used, switching it alternately between the transmitter and receiver and controlling its polarization by electrical techniques.

Surprisingly, it has been found that the effect of any given forest on the polarization of the radar signal is highly uniform throughout the entire forest, so that, once the radar has been adjusted for optimum clutter reduction by polarization methods, it need not be readjusted for searching over different portions of the same forest.

The target also has an effect on the polarization of the echo signal. It will rotate the polarization, and to some extent will depolarize the signal. The effect of the target, however, on the polarization of the signal is almost always different from the effect of the forest, so that, by tuning for a null in the average clutter, the ratio between the clutter and the desired target signal is very greatly enhanced.

The use of radiation within the stated range of frequencies enables the very ready detection of moving objects in the forest. This appears to be due to two major effects, the Doppler shift caused by the motion of the target, and the effect of the forest on the transmitted signals. The Doppler shift is well known and need not be discussed herein. The effect of the forest, however, does not appear to have been noted heretofore. It appears to cause a very uneven distribution of the transmitted signals, due probably to interference effects as the radiation is diffracted by the trees. As an object moves in the forest under radar surveillance, therefore, it passes through successive, closely spaced zones wherein the strength of the transmitted radiation is of different respective values. Accordinglyy, the echo signals returned from the target vary in proportion.

This latter effect is additive with the Doppler effect to cause fluctuations in the signal from the moving target which render that signal readily distinguishable from the relatively steady clutter signals under most ambient conditions.

For example, under winds of ten to about twenty miles per hour, the clutter signals from most forests so far observed fluctuate at a rate of about 0.2 Hz., while an echo signal from a man walking at a fairly slow pace of, say, about one foot per second, fluctuates at a rate of about 0.3 Hz. The difference in rate of fluctuation is readily discernible even when no special target emphasis technique is used. The radar signal may, for example, simply be displayed on an old-fashioned A-scope, and the fluctuations of the echo signal from the moving man in the forest will show as a readily discernible pulsation in the trace.

Another method of clutter reduction which is highly effective for enabling the detection of moving targets entails the use of subtraction techniques, several of which are known. See, for example, Introduction to Radar Systems, by Skolnik, (McGraw-Hill, Inc., 1962).

Another arrangement for taking advantage of the moving target effect which has given surprisingly effective results in actual practice without the use of other target signal emphasizing methods is to use a pulsed radar at about 150 mHz. with a repetition rate of about 10 kHz., and pulse length of about 0.1 microsecond, applying a range gate of the desired duration to the receiver to define a desired range, feeding the output signal of the receiver through a so-called boxcar circuit, modulating the output of the boxcar circuit with an audio tone signal of any desired pitch, typically about 1,000 Hz., and feeding the signal so modified to an audio transducer such as a headphone. The variations in signal strength in the successive parts of the forest, augmented by the beat frequency signals due to the Doppler effect, produce readily recognizable fluctuations in the output of the audio transducer indicating the presence of a moving target in the region of the forest under surveillance.

In the absence of a moving target, only the steady audio tone, modified by a fairly slow variation in level, typically 0.1 to 0.2 Hz. under mild wind conditions, is heard from the transducer. When a moving target invades the field, one that moves significantly faster than the swaying of the large tree branches, a characteristic variation is heard from the transducer at a rate corresponding to the rate of motion of the target. For a walking man, it is almost as if the observer were listening to the actual walking.

Instead of modulating the range-defined signal with an audio tone and feeding it to an electroacoustical transducer, other techniques may be used for analyzing it such as, for example, modern filtering techniques, or wave form analysis.

This type of recognition is not effective for very slowly moving targets, and becomes increasingly difficult as the winds increase. Depending on the nature of the particular forest, winds in excess of 20 to 30 m.p.h. may make this method of moving target discrimination impracticable. In such cases, other methods of target signal emphasis and discrimination may be used such as, for example, the polarization techniques mentioned hereinabove, and certain known methods of analyzing Doppler signals, or the Mie region signal analysis described and claimed in our hereinabove identified copending application. This latter method is effective regardless of the state of motion of the target, whether it be at rest or moving.

The practice of the invention has been tested in hilly terrain to simulate its operation from aircraft. From the results achieved, it appears that the method is fully feasible for detecting personnel, and especially armed personnel, in jungles from the air. Preferably, a slow aircraft such as a helicopter is used to avoid difficulties due to complicated Doppler effects.

Another aspect of the invention deals with the use of the target resonance effect for increasing the radar cross section of predetermined targets, thereby to enhance the response of the radar to those targets and to render the target signals more readily discernible over clutter. The technique has been found to be effective for emphasizing echo signals from electrically conductive objects such as guns, for example, and human bodies, which respond similarly. Searching in forest terrain is primarily a military problem and is of considerable concern at the present time because of the limited warfare situation in Southeast Asia. It has become highly desirable to enable the detection of armed personnel in the jungle, and, therefore, the selection of a rifle or machine gun as the predetermined target to be made the principal object of the search is apt to be an optimum selection for the practice of the invention in a large majority of its utilizations. If a larger object such as, for example, a truck is selected, very much lower frequency radiation must be used to produce a resonant response than for the case of the rifle, and inconveniently large antennas are required to achieve the desired directivity and efficiency. It has also been found that signals at frequencies chosen to produce a resonant response from a rifle or machine gun are also back scattered to a highly satisfactory degree by unarmed personnel.

The phenomenon of target resonance is known. See, for example, discussions of radar cross section in the hereinabove identified text by Skolnik, and in a book, Radar System Engineering edited by Ridenour, published by McGraw-Hill Book Co., Inc. (1947). Briefly, the effect results in a very significant increase in the radar cross sections of electrically conductive targets at certain frequencies related to the dimensions and shapes of the targets. For elongated cylinders, for example, which may be likened to dipole antennas, the resonant frequencies are those for which the length of the cylinder is a half wavelength or an integral number of half wavelengths up to about five or six. At these particular frequencies, which lie within a region of the spectrum known as the Mie region, the radar cross section of a conductive target is greatly enhanced relative to its cross section due to ordinary reflection. At frequencies significantly higher than the Mie region, ordinary reflection only is returned by the target, and at frequencies lower than the Mie region, the reflected energy rapidly falls off to very low values.

In the practice of the invention, it has been found that the resonance effect is reduced by damping factors, yet is still of significant value. For example, a rifle held lightly near its center gives a resonant return at about 150 mHz. more than ten times greater than the return due to ordinary reflection. If the rifle is damped, however, by being tightly held at two points near its ends, the return is reduced to a value of only about two or three times the ordinary value, and, in addition, its resonant frequency is decreased by as much as a third. Even with the reduction of response due to damping, the improvement over the response obtained at nonresonant frequencies is of advantage in enabling the detection of the desired targets, both by the improvement in the target signal-to-clutter ratio, and by enabling target identification by spectral analysis of the echo signal.

What is claimed is:

1. Method of detecting a predetermined target in a forest comprising searching the forest with a radar tuned to a frequency of between 30 megahertz and 600 megahertz.

2. Method of detecting a predetermined target in a forest comprising searching the forest with a radar tuned to a frequency of between 100 mHz. and 200 mHz 3. Method according to claim 1 including also the step of emphasizing an echo signal received from the target relative to the clutter signal received from the forest.

4. Method of detecting a predetermined electrically conductive target in a forest comprising searching the forest with a radar tuned to a frequency of between 30 mHz. and 600 mHz. at which the predetermined target is known to produce a resonant response, and analyzing the received echo signals to discriminate between clutter signals returned from the forest and echo signals returned from the predetermined target.

5. Method of detecting a predetermined target in a forest comprising searching the forest with a radar tuned to a frequency of between 30 mHz. and 600 mHz., and adjusting the polarization of the radiation transmitting and receiving transducer means of the radar to minimize the average clutter over the range of search interest.

6. Method of detecting a moving target in a forest comprising searching the forest with a radar tuned to a frequency of between 30 mHz. and 600 mHz., and detecting the difference between fluctuations of the clutter signal received from the forest and fluctuations of the echo signal received from the target.

7. Method of detecting a predetermined electrically conductive target in a forest comprising searching the forest with a radar tuned to a frequency of between 30 mHz. and 600 mHz. at which the predetermined target is known to produce a resonant response, analyzing the echo signals received at the radar to determine the relative echo signal strengths at different preselected frequencies, and comparing the relative strengths with a predetermined Mie region characteristic of the predetermined target.

8. Radar apparatus for searching in forest terrain comprising:
 (a) a radar transmitter arranged to operate at a frequency of between 30 mHz. and 600 mHz.,
 (b) a radar receiver arranged to operate at substantially the same frequency as said transmitter, and
 (c) means for discriminating between clutter signals received from the forest and echo signals received from a predetermined target.

9. Radar apparatus according to claim 8, wherein said discriminating means comprises means for controllably adjusting said receiver to respond primarily to radiation signals polarized differently from the polarization of signals transmitted by said transmitter.

10. Radar apparatus according to claim 8, wherein said discriminating means comprises signal analysis means for detecting echo signal frequency components characteristic of a predetermined target.

11. Radar apparatus according to claim 8, wherein said discriminating means comprises means for detecting fluctuations of echo signals received from a target moving in the forest relative to clutter signals received from the forest itself.

References Cited

UNITED STATES PATENTS

| | | |
|---|---|---|
| 1,504,247 | 8/1924 | Jacques. |
| 2,508,571 | 5/1950 | Hudspeth _____ 343—100.3 |
| 2,822,536 | 2/1958 | Sandretto. |
| 2,896,204 | 7/1959 | Gille. |
| 3,163,861 | 12/1964 | Suter. |

OTHER REFERENCES

Skolnik: Radar Systems, McGraw-Hill (1962), pp. 40–41.

RODNEY D. BENNETT, JR., Primary Examiner

T. H. TUBBESING, Assistant Examiner

U.S. Cl. X.R.

343—100